Sept. 22, 1931.                 C. L. SNYDER                    1,824,634
                            TEMPORARY HUB EXTENSION
                   Filed Aug. 1, 1927        2 Sheets-Sheet 1

INVENTOR.
C. L. Snyder.
BY Bryant
ATTORNEY.

Sept. 22, 1931.         C. L. SNYDER         1,824,634
TEMPORARY HUB EXTENSION
Filed Aug. 1, 1927          2 Sheets-Sheet 2
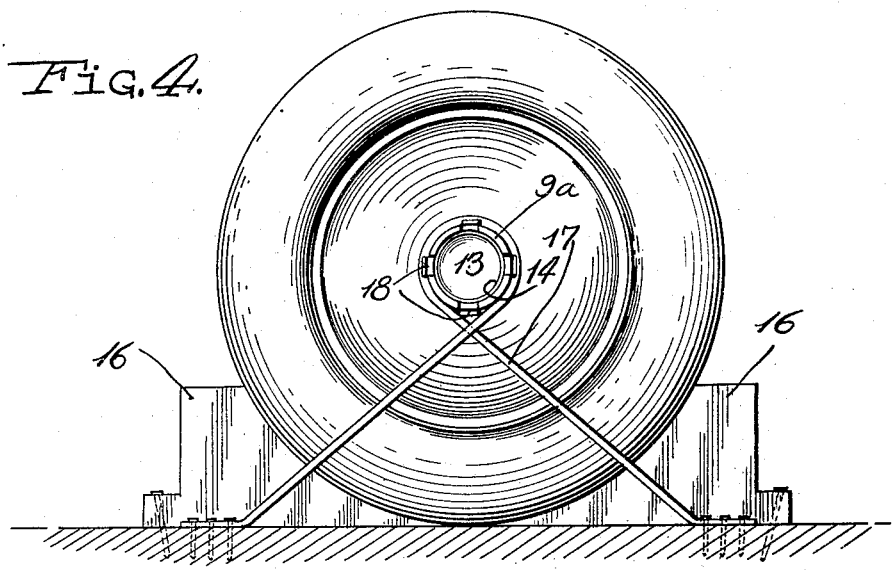
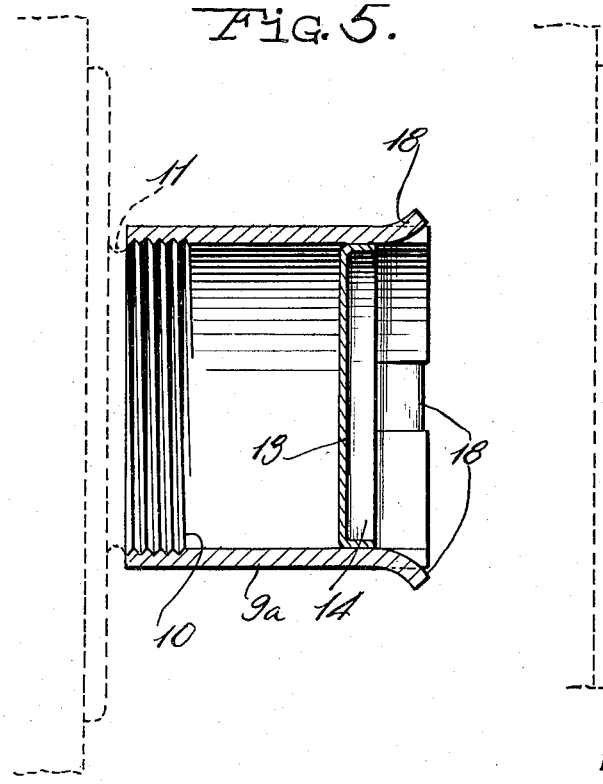
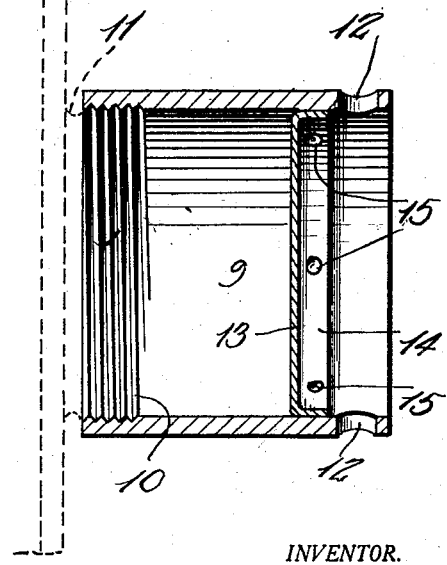
INVENTOR.
C. L. Snyder.
BY
ATTORNEY.

Patented Sept. 22, 1931

1,824,634

UNITED STATES PATENT OFFICE

CLIFFORD L. SNYDER, OF DETROIT, MICHIGAN, ASSIGNOR TO EVANS PRODUCTS COMPANY, OF DETROIT, MICHIGAN, A CORPORATION OF DELAWARE

TEMPORARY HUB EXTENSION

Application filed August 1, 1927. Serial No. 210,000.

In shipping automobiles, it is customary to support the same by the hubs of the wheels thereof in an elevated position within the freight car, or to tie the same down by the hubs of the wheels thereof upon the floor of the freight car. Very often, the hubs of the automobile wheels are made so short that they will not engage or rest properly on the supports or "decking" and may not be properly engaged by the tie-down or hold-down devices. It has therefore been found necessary to provide temporary hub extensions for the vehicle wheels to properly engage the automobile supports or to be properly engaged by the tie-down devices, whereby the automobile will be effectively supported or held in position during shipment.

The primary object of the present invention, therefore, is to provide a simple and durable hub extension for use in the shipment of automobiles, having the advantages of being light in weight, capable of being cheaply and easily manufactured, and so constructed as to effectively exclude the entrance of dirt and grit into the bearings of the wheel hubs when the dust caps of the latter are replaced temporarily by the present hub extensions.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a transverse sectional view of a freight car illustrating the manner of employing hub extensions constructed in accordance with the present invention, in supporting or holding automobiles against movement within a freight car;

Figure 4 is a side elevational view showing the manner in which each wheel of an automobile is blocked and tied down upon the floor of a freight car, the hub of the wheel being provided with a further modified form of hub extension constructed in accordance with the present invention and particularly adapted for engagement by a tie-down device;

Figure 5 is an enlarged central longitudinal section of the hub extension shown in Figure 4; and Figure 6 is a view similar to Figure 2, showing a still further slight modification of the device shown in the latter figure.

Figure 1:
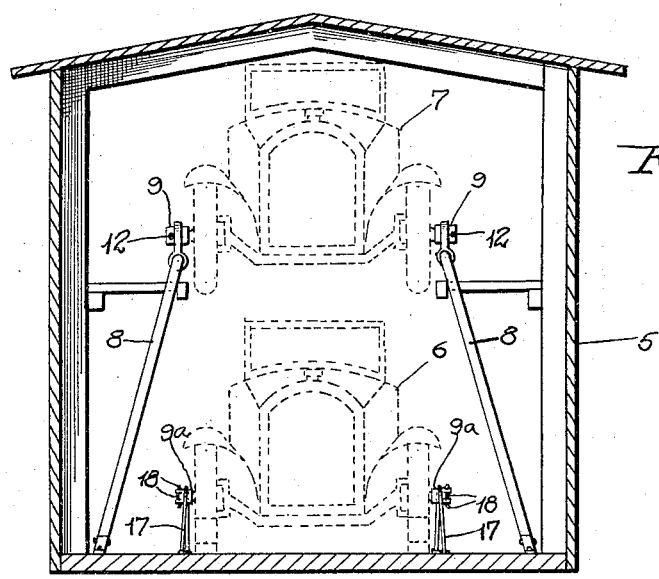

Referring more in detail to the drawings, 5 indicates the body of a freight car upon the floor of which a number of the automobiles are loaded as at 6. Other automobiles as indicated at 7 are supported in an elevational position within the freight car body during shipment, as by the use of suitable supports or "decking" bucks 8, the elevated automobiles being supported by the hubs of the wheels thereof which engage or suitably rest upon the bucks 8 as shown. In cases where the hubs of the automobile wheels are excessively short so that they will not properly engage or rest upon the loading bucks 8, extensions must be provided upon said hubs. For this purpose I provide an extension in the form of a cylindrical body 9 consisting of a short rigid metal tube internally threaded at one end as at 10 for being readily threaded onto the externally threaded end of the wheel hub indicated at 11 by dotted lines. The other end of the body or tube section 9 is preferably provided with a pair of opposed openings 12 which are adapted to receive a bar or the lugs of a spanner wrench, whereby the hub extension may be readily threaded onto the wheel hub. Secured in the outer end portion of the hub extension body 9 is a relatively stiff thin sheet metal closure plug consisting of a disk 13 having a marginal annular flange 14 firmly pressed outwardly into engagement with the inner surface of the hub extension body 9 so as to be effectively retained in place under ordinary conditions of use. This closure plug effectively closes the outer end of the hub extension body and excludes the entrance of dirt and other foreign matter into the same so that such dirt and foreign matter may not find its way into the bearings of the wheel hub for causing undesirable excessive wear of the bearing parts when the automobile is later placed into use.

Figure 2:
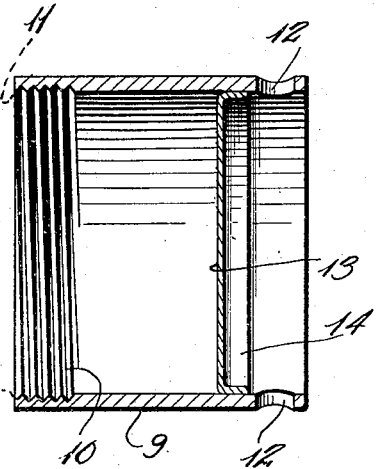
Figure 2 is an enlarged central longitudinal section of a hub extension constructed in accordance with the present invention, and particularly adapted for use in connection with automobiles supported in an elevated position.
Figure 3:
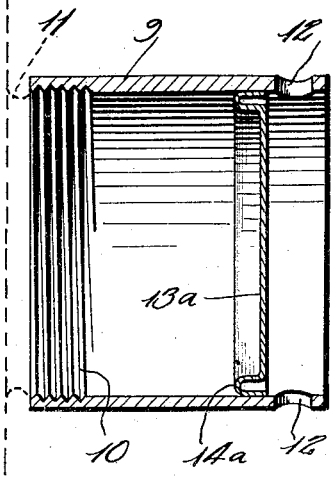
Figure 3 is a view similar to Figure 2, of a modified form of the hub extension shown in the latter figure.

The device of Figure 3 is the same as that of Figure 2, except that the closure plug consists of a smaller metal disk 13a having a resilient return bent annular marginal flange 14a whose concentric walls are spaced, the outer wall being firmly pressed into engagement with the inner surface of the body 9. The resilient flange 14a insures additional tension so that the outer wall of the flange will be tightly held against the body 9.

As shown in Figure 6, the flange 14 may be positively secured to, as well as frictionally engaged with, the body 9, by spot-welding, riveting, or the like, as at 15, thus positively guarding against the possibility of the closure plug being knocked out of the body.

It will be noted that the devices of Figures 2, 3 and 6 are devoid of external projections which might prevent the hub extensions from resting properly in the heads of the decking bucks or supports 8.

In loading the automobiles upon the floor of the freight car, each wheel is blocked at the front and rear by chock blocks 16, in the usual way, and the hub extension of the wheel is engaged by the intermediate portion of a hold-down device 17 whose ends are fastened to the car floor, as shown in Figure 4. The hub extension used in this instance is substantially the same as used with the wheels of the elevated automobiles and shown in Figures 2, 3 and 6, except that the body 9a, is provided at its outer end with pairs of longitudinal slits at spaced uniform intervals to define stop tongues 18 which are outturned as shown in Figure 5 to prevent the intermediate portion of the hold-down device 17 from slipping outwardly off of the hub extension.

Hub extensions constructed in accordance with the above will be found extremely strong and durable although of comparatively light weight, an item of considerable importance when it is remembered that hub extensions of this kind are usually returned in great numbers to the original shipper for re-use. Thus, the present hub extensions which are composed of sections of commercial wrought iron tubing will have advantages over cast metal constructions although possessing all of the advantages of the latter.

From the foregoing description it is believed that the construction and manner of use, as well as the advantages of the present invention will be readily understood and appreciated by those skilled in the art.

Minor changes may be made without departing from the spirit and scope of the invention as claimed.

What I claim as new is:—

A temporary wheel-hub extension for use in the shipment of automobiles comprising a short section of rigid metal tubing internally threaded at one end for detachable engagement with the threaded end of a wheel hub, and a closure plug fitted and secured in the other end of said tubing section, said closure plug embodying a sheet metal disk having an annular marginal flange firmly pressed outwardly against the inner surface of the tubing section, said tubing section having spaced pairs of longitudinal slits in said other end thereof defining a tongue between the slits of each pair, said tongues being out-turned to form stops.

In testimony whereof I affix my signature.

CLIFFORD L. SNYDER.